US008983754B2

(12) United States Patent
Watanabe et al.

(10) Patent No.: US 8,983,754 B2

(45) Date of Patent: Mar. 17, 2015

(54) APPARATUS FOR CONTROLLING AIR-FUEL RATIO OF INTERNAL-COMBUSTION ENGINE

(75) Inventors: Seiji Watanabe, Wako (JP); Tooru Sekiguchi, Wako (JP); Hiroyuki Ando, Wako (JP); Atsuhiro Miyauchi, Wako (JP); Takeshi Aoki, Wako (JP); Michinori Tani, Wako (JP); Soichiro Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 478 days.

(21) Appl. No.: 13/473,593

(22) Filed: May 17, 2012

(65) Prior Publication Data

US 2013/0054112 A1 Feb. 28, 2013

(30) Foreign Application Priority Data

Aug. 29, 2011 (JP) ................................ 2011-185821

(51) Int. Cl.

*B60T 7/12* (2006.01)
*G05D 1/00* (2006.01)
*G06F 7/00* (2006.01)
*G06F 17/00* (2006.01)
*F02D 41/14* (2006.01)
*F02D 41/28* (2006.01)

(52) U.S. Cl.

CPC ........ *F02D 41/1456* (2013.01); *F02D 41/1495* (2013.01); *F02D 2041/288* (2013.01)
USPC ........... 701/104; 701/103; 123/672; 123/673; 123/674; 123/679

(58) Field of Classification Search

CPC ........... F02D 41/0085; F02D 41/1441; F02D 41/1458; F02D 41/1495
USPC .................... 123/673–684; 73/114.02, 114.2, 73/114.25, 114.26, 114.31; 701/102–104, 701/109

See application file for complete search history.

(56) References Cited

U.S. PATENT DOCUMENTS

| | | | | |
|---|---|---|---|---|
| 6,684,150 | B2 * | 1/2004 | Yasui et al. | 701/106 |
| 6,925,372 | B2 * | 8/2005 | Yasui | 701/109 |
| 7,027,909 | B2 * | 4/2006 | deBotton et al. | 701/111 |
| 7,032,374 | B2 * | 4/2006 | Okazaki et al. | 60/285 |
| 7,152,594 | B2 * | 12/2006 | Anilovich et al. | 123/690 |
| 2003/0101975 | A1 * | 6/2003 | Yoshizawa et al. | 123/674 |

(Continued)

FOREIGN PATENT DOCUMENTS

JP 2011-144754 7/2011

*Primary Examiner* — Thomas Moulis
*Assistant Examiner* — Joseph Dallo
(74) *Attorney, Agent, or Firm* — Mori & Ward, LLP

(57) ABSTRACT

An apparatus for controlling an air-fuel ratio of an internal-combustion engine includes an air-fuel ratio detector, a fluctuation signal generating device, an air-fuel ratio fluctuation device, a 0.5th-order frequency component strength calculator, a fluctuation frequency component strength calculator, a reference component strength calculator, and an imbalance fault determining device. The reference component strength calculator is configured to calculate strength of a reference component in accordance with strength of a first frequency component and strength of a second frequency component. The imbalance fault determining device is configured to make a determination of an imbalance fault in which air-fuel ratios of a plurality of cylinders vary beyond a tolerance limit on a basis of a relative relationship between strength of the 0.5th-order frequency component and the strength of the reference component.

20 Claims, 11 Drawing Sheets

(56) References Cited

U.S. PATENT DOCUMENTS

| | | | | |
|---|---|---|---|---|
| 2003/0114979 | A1* | 6/2003 | Yoshizawa et al. | 701/109 |
| 2003/0150441 | A1* | 8/2003 | Saga | 123/674 |
| 2007/0198163 | A1* | 8/2007 | Yasui et al. | 701/103 |
| 2008/0147297 | A1* | 6/2008 | Nakagawa et al. | 701/103 |
| 2008/0257325 | A1* | 10/2008 | Takubo | 123/672 |
| 2009/0306879 | A1* | 12/2009 | Takubo | 701/104 |
| 2010/0217506 | A1* | 8/2010 | Mizoguchi et al. | 701/109 |
| 2011/0192146 | A1* | 8/2011 | Sugimoto et al. | 60/276 |

* cited by examiner

APPARATUS FOR CONTROLLING AIR-FUEL RATIO OF INTERNAL-COMBUSTION ENGINE

CROSS-REFERENCE TO RELATED APPLICATIONS

The present application claims priority under 35 U.S.C. §119 to Japanese Patent Application No. 2011-185821, filed Aug. 29, 2011, entitled "Apparatus for Controlling Air-Fuel Ratio of Internal-Combustion Engine." The contents of this application are incorporated herein by reference in their entirety.

BACKGROUND OF THE INVENTION

1. Field of the Invention

The present application relates to an apparatus for controlling an air-fuel ratio of an internal-combustion engine.

2. Discussion of the Background

An air-fuel ratio control apparatus having the function of determining an imbalance fault on the basis of a signal output from an air-fuel ratio sensor in an engine exhaust system is described in Japanese Unexamined Patent Application Publication No. 2011-144754. That apparatus executes air-fuel ratio fluctuation control of causing an air-fuel ratio at a predetermined frequency during an engine operation and determines an imbalance fault using a determination parameter obtained by dividing the strength of a 0.5th-order frequency component contained in a signal output from the air-fuel ratio sensor during the execution of the control by the strength of a predetermined frequency component. The 0.5th-order frequency component is the ½ frequency component of the frequency corresponding to a rotation speed of the engine. When an imbalance fault occurs, the strength of the 0.5th-order frequency component increases, and the value of the determination parameter increases with an increase in the degree of the imbalance. Accordingly, an imbalance fault can be determined by comparing the value of the determination parameter with a predetermined threshold.

With the technique described in Japanese Unexamined Patent Application Publication No. 2011-144754, when the response characteristic (frequency characteristic) of the air-fuel ratio sensor degrades and the strength of the 0.5th-order frequency component decreases, the strength of the predetermined frequency component also decreases. Thus, the use of the determination parameter, which is a ratio, in both enables the determination accuracy to be maintained high.

SUMMARY OF THE INVENTION

According to one aspect of the present invention, an apparatus for controlling an air-fuel ratio of an internal-combustion engine includes an air-fuel ratio detector, a fluctuation signal generating device, an air-fuel ratio fluctuation device, a 0.5th-order frequency component strength calculator, a fluctuation frequency component strength calculator, a reference component strength calculator, and an imbalance fault determining device. The air-fuel ratio detector is configured to detect an air-fuel ratio in an exhaust path of the internal-combustion engine including a plurality of cylinders. The fluctuation signal generating device is configured to generate a fluctuation signal for causing the air-fuel ratio to fluctuate using a first signal with a first frequency and a second signal with a second frequency. The first frequency is different from a 0.5th-order frequency. The 0.5th-order frequency is equal to ½ of a frequency corresponding to a rotation speed of the internal-combustion engine. The second frequency is higher than the first frequency and different from the 0.5th-order frequency. The air-fuel ratio fluctuation device is configured to cause the air-fuel ratio to fluctuate in accordance with the fluctuation signal. The 0.5th-order frequency component strength calculator is configured to calculate strength of a 0.5th-order frequency component corresponding to the 0.5th-order frequency contained in an output signal of the air-fuel ratio detector. The fluctuation frequency component strength calculator is configured to calculate strength of a first frequency component corresponding to the first frequency and strength of a second frequency component corresponding to the second frequency during operation of the air-fuel ratio fluctuation device. The first frequency component and the second frequency component are contained in the output signal of the air-fuel ratio detector. The reference component strength calculator is configured to calculate strength of a reference component in accordance with the strength of the first frequency component and the strength of the second frequency component. The imbalance fault determining device is configured to make a determination of an imbalance fault in which air-fuel ratios of the plurality of cylinders vary beyond a tolerance limit on a basis of a relative relationship between the strength of the 0.5th-order frequency component and the strength of the reference component.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
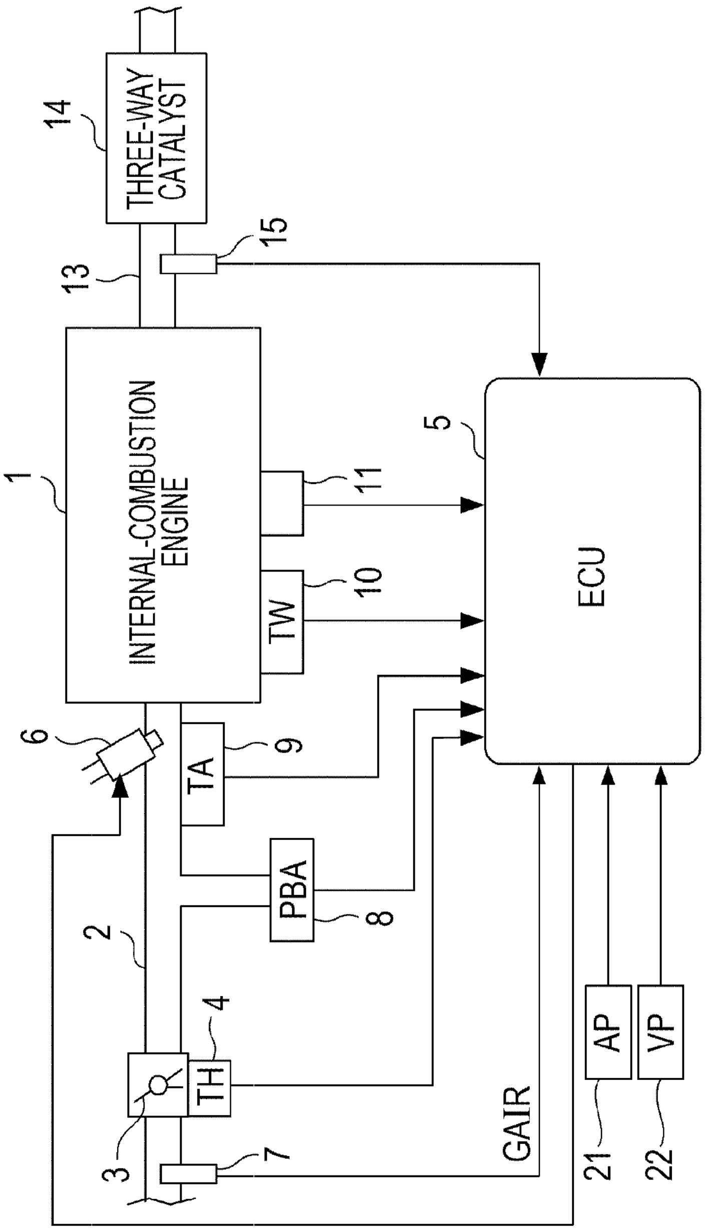
FIG. 1 illustrates a configuration of an internal-combustion engine and a control apparatus therefor according to an embodiment.

The embodiments will now be described with reference to the accompanying drawings, wherein like reference numerals designate corresponding or identical elements throughout the various drawings.

First Embodiment

FIG. 1 is an overview diagram of an internal-combustion engine (hereinafter referred to as "engine") and an air-fuel ratio control apparatus therefor. An engine 1 can be a four-cylinder engine, and a throttle valve 3 is positioned within an inlet pipe 2 of the engine 1. The throttle valve 3 is coupled to a throttle-valve opening degree sensor 4 for detecting the degree TH of opening of the throttle valve (hereinafter referred to as "throttle-valve opening degree TH"), and a signal detected by the throttle-valve opening degree sensor 4 is supplied to an electronic control unit (ECU) 5.

A fuel injection valve 6 is disposed between the engine 1 and the throttle valve 3, provided for each cylinder, and located slightly upstream of an induction valve (not illustrated) for the inlet pipe 2. Each of the fuel injection valves 6 is connected to a fuel pump (not illustrated) and electrically connected to the ECU 5. The time of opening of the fuel injection valve 6 is controlled by a signal from the ECU 5.

An intake air flow sensor 7 for detecting an intake air flow amount GAIR is disposed upstream of the throttle valve 3. An intake air pressure sensor 8 for detecting an intake air pressure PBA and an intake air temperature sensor 9 for detecting an intake air temperature TA are disposed downstream of the throttle valve 3, and a signal detected by each of these sensors is supplied to the ECU 5. A cooling water temperature sensor 10 for detecting an engine cooling water temperature TW is attached to the main body of the engine 1, and a signal detected by the cooling water temperature sensor 10 is supplied to the ECU 5.

The ECU 5 is connected to a crank angle position sensor 11 for detecting a rotation angle of a crankshaft (not illustrated) of the engine 1, and a signal corresponding to the rotation angle of the crankshaft is supplied to the ECU 5. The crank angle position sensor 11 includes a cylinder discrimination sensor, a TDC sensor, and a CRK sensor. The cylinder discrimination sensor outputs a pulse (hereinafter referred to as "CYL pulse") at a predetermined crank angle position of a specific cylinder of the engine 1. The TDC sensor outputs a TDC pulse at a crank angle position before the predetermined crank angle for a top dead center (TDC) at the time of starting an intake stroke of each cylinder (at every 180 degrees of the crank angle in the case of a four-cylinder engine). The CRK sensor generates one pulse (hereinafter referred to as "CRK pulse") at certain crank angle intervals shorter than a TDC pulse (for example, at 6-degree intervals). The CYL pulse, TDC pulse, and CRK pulse are supplied to the ECU 5. These pulses are used in controlling various types of timing, such as controlling fuel injection timing and ignition timing, and in detecting the number of revolutions of an engine (engine rotation speed) NE.

An exhaust path 13 is provided with a three-way catalyst 14. The three-way catalyst 14 has the capability of storing oxygen. The three-way catalyst 14 has the function of storing oxygen in exhaust gas in an exhaust lean condition where the air-fuel ratio of an air-fuel mixture supplied to the engine 1 is leaner than the stoichiometric air-fuel ratio and the concentration of oxygen in exhaust gas is relatively high. In contrast, the three-way catalyst 14 has the function of oxidizing HC and CO in exhaust gas using stored oxygen in an exhaust rich condition where the air-fuel ratio of an air-fuel mixture supplied to the engine 1 is richer than the stoichiometric air-fuel ratio, the concentration of oxygen in exhaust gas is relatively low, and the amount of the components of HC and CO is large.

A proportional oxygen concentration sensor 15 (hereinafter referred to as "LAF sensor 15") is disposed upstream of the three-way catalyst 14 and downstream of the gathered part of an exhaust manifold communicating with the cylinders. The LAF sensor 15 outputs a detection signal substantially proportional to the concentration of oxygen in exhaust gas (air-fuel ratio) and supplies it to the ECU 5.

The ECU 5 is connected to an accelerator sensor 21 for detecting the amount AP of pressing of the accelerator pedal of the vehicle driven by the engine 1 (hereinafter referred to as "accelerator pedal operation amount AP") and a vehicle speed sensor 22 for detecting a traveling speed of that vehicle (vehicle speed) VP. A signal detected by each of these sensors is supplied to the ECU 5. The opening and closing of the throttle valve 3 is driven by an actuator (not illustrated), and the throttle-valve opening degree TH is controlled by the ECU 5 in accordance with the accelerator pedal operation amount AP.

The engine 1 is provided with a known exhaust return mechanism, which is not illustrated.

The ECU 5 includes an input circuit having the functions of shaping the waveform of an input signal from various sensors, correcting a voltage level to a predetermined level, converting an analog signal value to a digital signal value, and performing other processing, a central processing unit (CPU), a storage circuit that stores various processing programs executed by the CPU, processing results, and other data, and an output circuit that supplies a driving signal to the fuel injection valve 6.

The CPU of the ECU 5 determines various engine driving states on the basis of a detection signal from the above-described various sensors and computes a fuel injection time TOUT of the fuel injection valve 6 for which it opens in synchronization with a TDC pulse in accordance with a determined engine driving state using the following expression (1). The fuel injection time TOUT is substantially proportional to the amount of the fuel injected and is referred to as "fuel injection amount TOUT" in the following description.

$$TOUT = TIM \times KCMD \times KAF \times KTOTAL \qquad (1)$$

Here, TIM indicates the basic fuel amount, specifically, the basic fuel injection time of the fuel injection valve 6 and is determined by searching a TIM table set in accordance with the intake air flow amount GAIR. The TIM table is set such that the air-fuel ratio AF of an air-fuel mixture burned in the engine is virtually equal to the stoichiometric air-fuel ratio.

KCMD indicates a target air-fuel ratio coefficient set in accordance with a driving state of the engine 1. The target air-fuel ratio coefficient KCMD is proportional to the inverse of the air-fuel ratio A/F, that is, to the fuel-air ratio F/A and is the value 1.0 for the stoichiometric air-fuel ratio, and thus hereinafter it is referred to as "target equivalent ratio." As described below, to determine an imbalance fault of an air-fuel ratio, the target equivalent ratio is set so as to change in a sinusoidal form over time in the range of 1.0±DAF.

KAF indicates an air-fuel ratio correction coefficient calculated by proportional integral derivative (PID) control or adaptive control using an adaptive controller (self tuning regulator) such that, when the execution condition for air-fuel ratio feedback control is satisfied, the detected equivalent ratio KACT calculated from the detected value of the LAF sensor 15 is equal to the target air-fuel ratio coefficient KCMD.

KTOTAL indicates the product of other correction coefficients (e.g., a correction coefficient KTW corresponding to the engine cooling water temperature TW and a correction coefficient KTA corresponding to the intake air temperature TA) computed in accordance with various engine parameter signals.

The CPU of the ECU 5 supplies a driving signal for causing the fuel injection valve 6 to be opened on the basis of the fuel injection amount TOUT determined in the above-described way to the fuel injection valve 6 through the output circuit. The CPU of the ECU 5 determines an imbalance fault as described below.

Figure 2A:
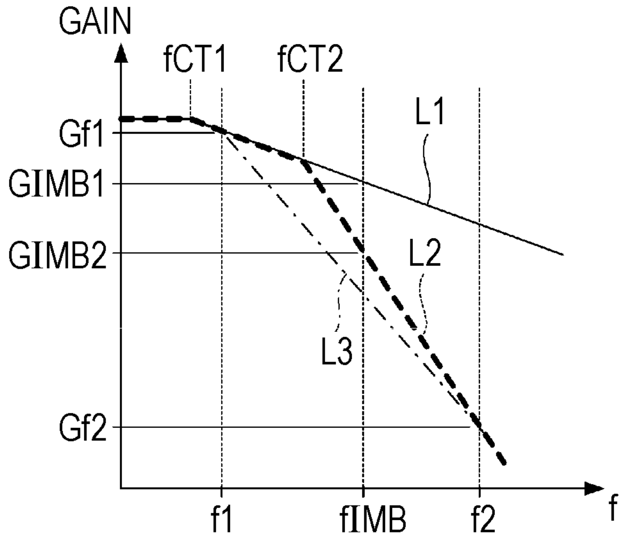
FIGS. 2A and 2B are Bode plots for describing a technique for determining an imbalance fault according to the embodiment.
Figure 2B:
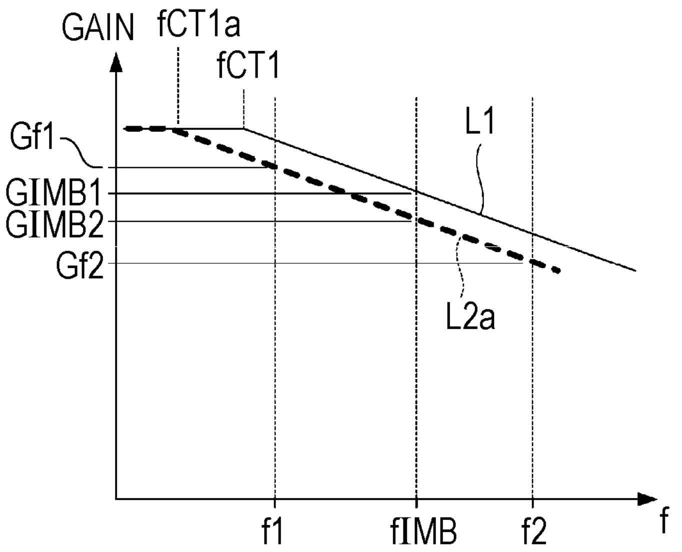

FIGS. 2A and 2B are Bode plots for describing a technique for determining an imbalance fault according to the present embodiment. The frequency response characteristic of the LAF sensor 15 can be approximated using a first-order lag model and thus is indicated by the thin solid line L1 (fCT1 is the cutoff frequency before degradation). However, if the frequency response characteristic of the LAF sensor 15 degrades, it may be one that can be approximated using a higher-order model, for example, a second-order lag model. Such degradation model corresponds to FIG. 2A. The thick broken line L2 indicates the frequency response characteristic corresponding to the second-order lag model. fCT2 is a second cutoff frequency higher than the cutoff frequency fCT1. The "fCT1" is hereinafter referred to as "first cutoff frequency fCT1."

When the frequency response characteristic changes from the initial characteristic indicated by the solid line L1 to the degradation characteristic indicated by the broken line L2, because the gain at the frequency fIMB reduces from GIMB1 to GIMB2, the 0.5th-order frequency component strength MIMB of a 0.5th-order frequency component contained in an output signal SLAF of the LAF sensor decreases even when the degree of the imbalance is the same. The frequency fIMB is the 0.5th-order frequency equal to ½ of the engine rotation frequency fNE (=NE/60) corresponding to the number NE of revolutions of the engine [rpm]. The 0.5th-order frequency component strength MIMB is the strength of the component corresponding to the 0.5th-order frequency fIMB.

At this time, when air-fuel ratio fluctuation control is executed using the fluctuation signal Sf1 with the frequency f1 and the ratio between the strength MPTf1 of the component corresponding to the frequency f1 and the 0.5th-order frequency component strength MIMB (MIMB/MPTf1) is used as a determination parameter, the value of the determination parameter decreases even when the degree of the imbalance is the same, so there is a strong likelihood that normality will be incorrectly determined when an imbalance fault occurs.

To address this, in the present embodiment, air-fuel ratio fluctuation control is executed using, as a fluctuation signal, a signal in which a first signal Sf1 with a first frequency f1 and a second signal Sf2 with a second frequency f2 are combined; during the execution of air-fuel ratio fluctuation control, the strength MPTf1 of a component corresponding to the frequency f1 (hereinafter referred to as "first frequency component strength") and the strength MPTf2 of a component corresponding to the frequency f2 (hereinafter referred to as "second frequency component strength") contained in an LAF sensor output signal SLAF are calculated; in addition, the reference component strength MPTREF is calculated by applying the first frequency component strength MPTf1, the second frequency component strength MPTf2, the first and second frequencies f1 and f2, and the 0.5th-order frequency fIMB to the following expressions (11) to (13). The reference component strength MPTREF corresponds to an estimated value of the strength of the 0.5th-order frequency component contained in the LAF sensor output signal SLAF (hereinafter referred to as "normal 0.5th-order frequency component strength") when the air-fuel ratio fluctuation control for the 0.5th-order frequency fIMB is executed in the state where there is no imbalance of the air-fuel ratio. Expression (11) calculate an estimated value of the normal 0.5th-order frequency component strength by linear interpolation computation on the presumption that the first frequency component strength MPTf1 and the second frequency component strength MPTf2 are proportional to the gains Gf1 and Gf2 illustrated in FIG. 2A.

$$MPTREF = a \times MPTf1 + b \times MPTf2 \tag{11}$$

$$a = (f2 - fIMB)/(f2 - f1) \tag{12}$$

$$b = (fIMB - f1)/(f2 - f1) \tag{13}$$

The reference component strength MPTREF reflects the attenuation characteristic on a higher frequency side than the second cutoff frequency fCT2. Thus the determination accuracy can be more enhanced in comparison with when only the first signal with the frequency f1 is used as a fluctuation signal.

Another example of the degradation mode of the frequency response characteristic of the LAF sensor can be one in which approximation can be made using a first-order lag model and the cutoff frequency fCT1 reduces to fCT1*a*, as indicated by the thick broken line L2*a* illustrated in FIG. 2B. Even in such degradation mode, the estimated value of the normal 0.5th-order frequency component strength is obtainable by calculation of the reference component strength MPTREF using Expressions (11) to (13). In this mode, because the first frequency f1 is set at a frequency higher than the first cutoff frequency fCT1 before degradation, the relative relationship (ratio) among the gains Gf1, GIMB2, and Gf2 after degradation is the same as the relative relationship (ratio) before degradation, and a more accurate estimated value of the normal 0.5th-order frequency component strength than that in the mode illustrated in FIG. 2A is obtainable.

Figure 3:
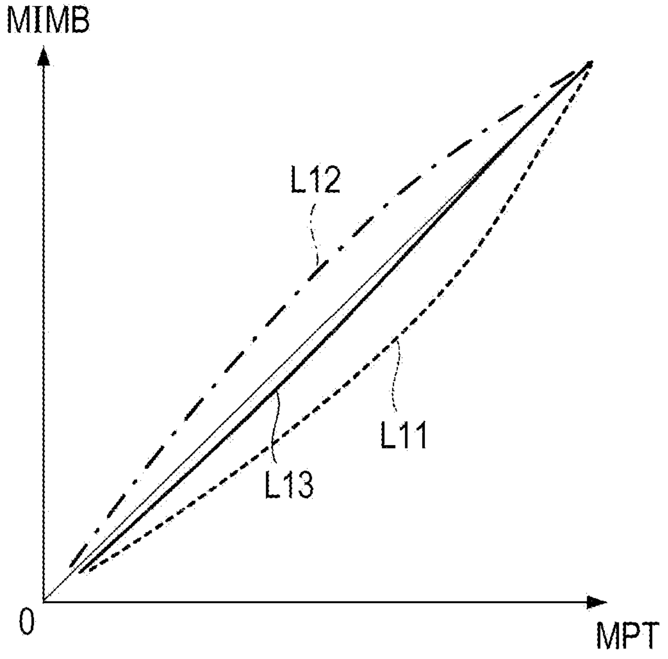
FIG. 3 is a graph that illustrates a relationship between the strength (MPT) of a fluctuation frequency component and the strength (MIMB) of a 0.5th-order frequency component contained in an output of an air-fuel ratio sensor during execution of air-fuel ratio fluctuation control.

FIG. 3 is a correlation diagram that illustrates the relationship between the fluctuation frequency component strength MPT (MPTf1, MPTf2, MRTREF) and the 0.5th-order frequency component strength MIMB in the case where the first frequency f1 is set at "0.4 fNE" and the second frequency f2 is set at "0.66 fNE." The broken line L11 indicates the relationship between the first frequency component strength MPTf1 and the 0.5th-order frequency component strength MIMB. The dot-and-dash line L12 indicates the relationship between the second frequency component strength MPTf2 and the 0.5th-order frequency component strength MIMB. The solid line L13 indicates the relationship between the reference component strength MPTREF and the 0.5th-order frequency component strength MIMB.

As illustrated in FIG. 3, when only one fluctuation signal is used, the correlation line indicating two parameters is a curve bent downward or upward (L11 or L12). This indicates that, irrespective of the degree of the imbalance of the air-fuel ratio, actual measurement data is distributed in such a curve and this is a cause of decrease in the determination accuracy. In contrast, the relationship between the reference component strength MPTREF calculated using both the first and second signals Sf1 and Sf2 and the 0.5th-order frequency component strength MIMB is represented by a substantially straight line (L13), and accurate determination can be made by determining that an imbalance fault is occurring when the determination parameter RT calculated by the following expression (14) is larger than the predetermined determination threshold RTTH.

$$RT=MIMB/MPTREF \quad (14)$$

Figure 4A:
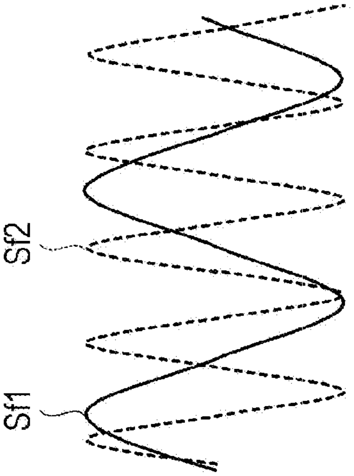
FIGS. 4A to 4C are timing charts for describing a technique for combining two signals with different frequencies and generating a fluctuation signal.
Figure 4B:
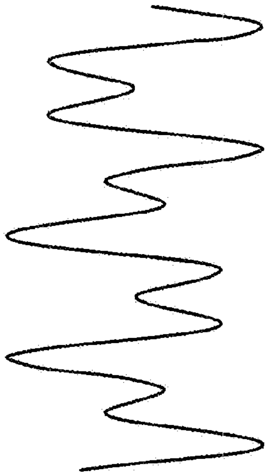
Figure 4C:
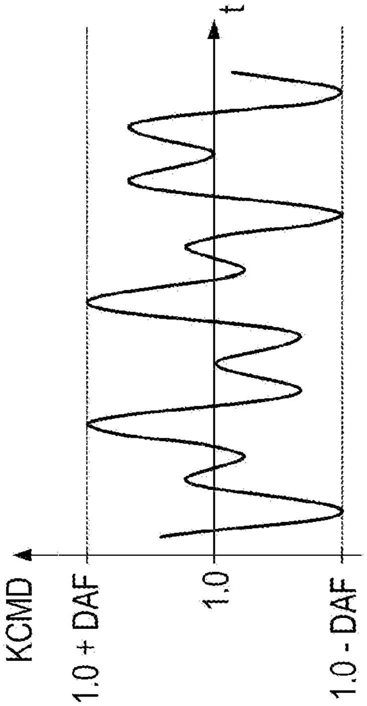

FIGS. 4A to 4C are illustrations for describing a fluctuation signal SPT according to the present embodiment. A signal in which the first signal Sf1 and the second signal Sf2 illustrated in FIG. 4A are combined (added) (FIG. 4B) is used as the fluctuation signal SPT. More specifically, as illustrated in FIG. 4C, air-fuel ratio fluctuation control is executed by causing the target equivalent ratio KCMD to fluctuate in the range of 1.0±DAF. DAF is the value of amplitude set at a predetermined value (a value determined by experiment, for example, approximately 0.02).

Figure 5:
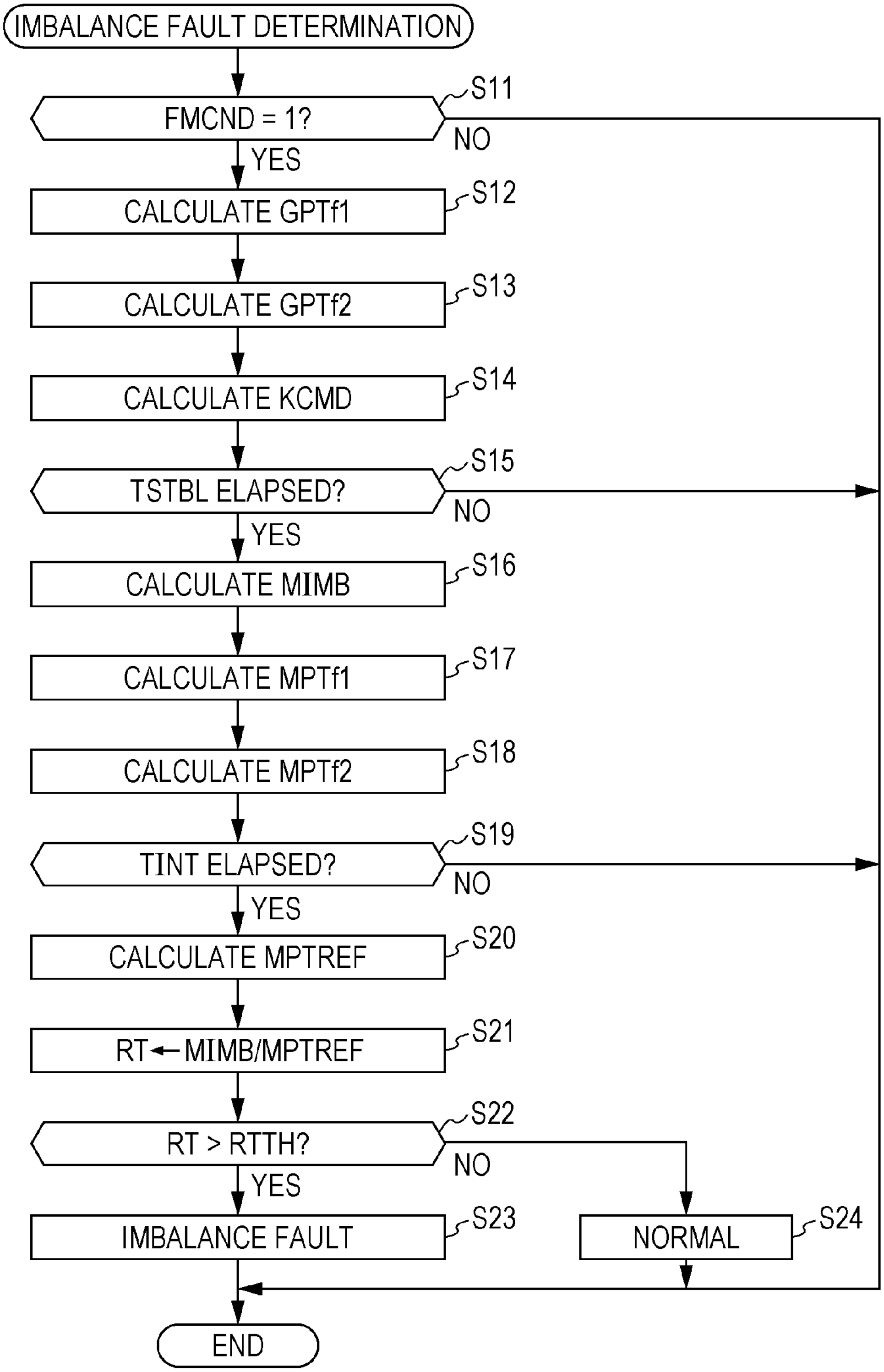
FIG. 5 is a flowchart of an imbalance fault determination process (first embodiment).

FIG. 5 is a flowchart of an imbalance fault determination process according to the present embodiment. This process is performed by the CPU of the ECU 5 every predetermined crank angle CACAL (for example, 30 degrees).

In Step S11, it is determined whether a determination examination condition flag FMCND is "1." The determination examination condition flag FMCND is set at "1" when all the following conditions 1) to 11) are satisfied, for example.

1) The number NE of revolutions of the engine is within the range between predetermined upper and lower limits.

2) The intake air pressure PBA is higher than a predetermined pressure (the amount of an exhaust flow required for determination is sufficient).

3) The LAF sensor 15 is in an activated state.

4) Air-fuel ratio feedback control in accordance with an output of the LAF sensor 15 is executed.

5) The engine cooling water temperature TW is higher than a predetermined temperature.

6) The amount DNE of change in the number NE of revolutions of the engine per unit time is smaller than a predetermined amount of change in the number of revolutions.

7) The amount DPBAF of change in the intake air pressure PBA per unit time is smaller than a predetermined amount of change in the intake air pressure.

8) An increase in the fuel for acceleration (that will occur in quick acceleration) does not occur.

9) The exhaust gas recirculation rate is larger than a predetermined value.

10) The output of the LAF sensor is not stuck at the upper or lower limit.

11) The response characteristic of the LAF sensor is normal (it is not determined that a fault caused by degradation in the response characteristic occurs).

When the determination of Step S11 is negative (NO), the process ends immediately. When FMCND is 1 (YES), air-fuel ratio fluctuation control is executed as described below, an imbalance fault determination is made. In the execution of the air-fuel ratio fluctuation control, the air-fuel ratio correction coefficient KAF is fixed at "1.0."

In Step S12, the first signal value GPTf1 corresponding to the first signal Sf1 is calculated by the following expression (15). Kf1 in Expression (15) indicates a first frequency coefficient set at, for example, "0.4," as described above, and k indicates the discretization time when discretization is performed in the execution interval CACAL of the present process.

$$GPTf1=\sin(Kf1\times CACAL\times k) \quad (15)$$

In Step S13, the second signal value GPTf2 corresponding to the second signal Sf2 is calculated by the following expression (16). Kf2 in Expression (16) indicates a second frequency coefficient set at, for example, "0.66," as described above.

$$GPTf2=\sin(Kf2\times CACAL\times k) \quad (16)$$

In Step S14, the target equivalent ratio KCMD is calculated by applying the first signal value GPTf1 and the second signal value GPTf2 to the following expression (17).

$$KCMD=DAF\times(GPTf1+GPTf2)+1 \quad (17)$$

In Step S15, it is determined whether the predetermined stabilization time TSTBL has elapsed from the start of execution of the air-fuel ratio fluctuation control. While the determination is negative (NO), the process ends immediately. When the determination in Step S15 becomes positive (YES), the strength of each of the frequency components contained in the output signal SLAF of the LAF sensor 15 is calculated in Steps S16 to S18.

That is, in Step S16, a band-pass filtering process of extracting a 0.5th-order frequency component is performed, amplitudes of extracted signals are integrated, and the 0.5th-order frequency component strength MIMB is calculated. In Step S17, a band-pass filtering process of extracting a frequency f1 component is performed, amplitudes of extracted signals are integrated, and the first frequency component strength MPTf1 is calculated. In Step S18, a band-pass filtering process of extracting a frequency f2 component is performed, amplitudes of extracted signals are integrated, and the second frequency component strength MPTf2 is calculated.

In Step S19, it is determined whether the predetermined integration time TINT has elapsed from the start of calculating the frequency component strength. While the determination is negative (NO), the process ends immediately. When the determination in Step S19 becomes positive (YES), the reference component strength MPTREF is calculated by Expression (11) provided above (Step S20). In Step S21, the determination parameter RT is calculated by applying the calculated 0.5th-order frequency component strength MIMB and reference component strength MPTREF to Expression (14) provided above.

In Step S22, it is determined whether the determination parameter RT is larger than the predetermined determination parameter threshold RTTH. When the determination is positive (YES), it is determined that an imbalance fault is occurring (Step S23). In contrast, when the determination is negative (NO), it is determined that the difference between the air-fuel ratios of the cylinders is within a tolerance limit (normal) (Step S24).

As described above, according to the present embodiment, air-fuel ratio fluctuation control is executed by generating the fluctuation signal SPT using the first signal Sf1 with the first frequency f1 lower than the 0.5th-order frequency fIMB and the second signal Sf2 with the second frequency f2 higher than the first frequency f1 and higher than 0.5th-order frequency fIMB and changing the target equivalent ratio KCMD in accordance with the fluctuation signal SPT. During the execution of air-fuel ratio fluctuation control, the strength MIMB of the 0.5th-order frequency component, the strength MPTf1 of the first frequency component, and the strength MPTf2 of the second frequency component contained in the LAF sensor output signal SLAF are calculated, and the reference component strength MPTREF is calculated in accordance with the first and second frequency component strengths MPTf1 and MPTf2. Then, an imbalance fault is determined on the basis of the relative relationship between the 0.5th-order frequency component strength MIMB and the reference component strength MPTREF. The first frequency component strength MPTf1 and the second frequency component strength MPTf2 are calculated using the two signals Sf1 and Sf2 having mutually different frequencies, the reference component strength MPTREF corresponding to the estimated value of the normal 0.5th-order frequency component strength detected when the air-fuel ratio fluctuation control is executed in the state where no imbalance of the air-fuel ratio exists is calculated in accordance with the first and second frequency component strengths MPTf1 and MPTf2, and the use of the reference component strength MPTREF enables the effects of degradation in the response characteristic of the LAF sensor 15 to be suppressed and enables an increase in the 0.5th-order frequency component strength MIMB resulting from an imbalance fault to be accurately determined. As a result, irrespective of degradation mode of the LAF sensor 15, a decrease in the accuracy of determining an imbalance fault can be suppressed, and the determination can be accurate.

Because the fluctuation signal SPT is generated by combining the first and second signals Sf1 and Sf2, the time required for imbalance fault determination can be shortened. Accordingly, degradation in the exhaust characteristic caused by imbalance fault determination can be suppressed.

Because the reference component strength MPTREF is calculated by combining the first and second frequency component strengths MPTf1 and MPTf2 at the ratio (a:b) corresponding to the first and second frequencies using Expressions (11) to (13) provided above, the proper estimated value of the normal 0.5th-order frequency component strength described above is obtainable. The determination parameter RT is calculated by dividing the 0.5th-order frequency component strength MIMB by the reference component strength MPTREF, and an imbalance fault is determined by comparing the determination parameter RT with the predetermined determination threshold RTTH. That is, the determination parameter RT corresponds to a parameter in which the 0.5th-order frequency component strength MIMB is normalized using the reference component strength MPTREF, and the use of this parameter can suppress the effects of the degradation in the response characteristic of the LAF sensor 15.

In the present embodiment, the LAF sensor 15 corresponds to an air-fuel ratio detecting unit, the fuel injection valve 6 corresponds to a part of an air-fuel ratio fluctuation unit, the ECU 5 corresponds to a fluctuation signal generating unit, a part of the air-fuel ratio fluctuation unit, a 0.5th-order frequency component strength calculating unit, a fluctuation frequency component strength calculating unit, a reference component strength calculating unit, and an imbalance fault determining unit. Specifically, Steps S12 and S13 illustrated in FIG. 5 correspond to the fluctuation signal generating unit and the air-fuel ratio fluctuation unit, Step S16 corresponds to the 0.5th-order frequency component strength calculating unit, Steps S17 and S18 correspond to the fluctuation frequency component strength calculating unit, Step S20 corresponds to the reference component strength calculating unit, and Steps S21 to S24 correspond to the imbalance fault determining unit.

Modification Example

Figure 6:
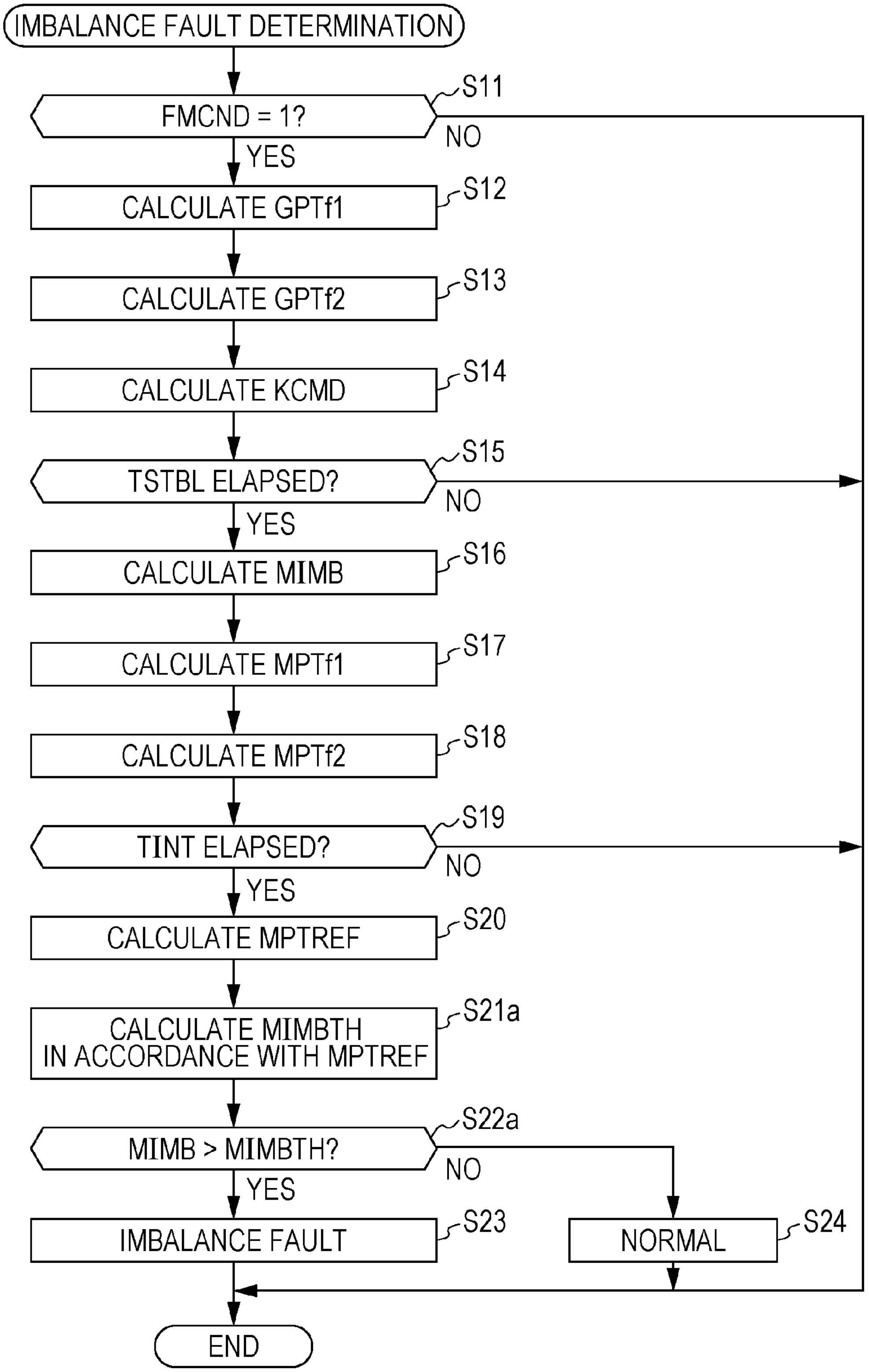
FIG. 6 is a flowchart that illustrates a modification example of the process illustrated in FIG. 5.

The process illustrated in FIG. 5 may be modified into the one illustrated in FIG. 6. In FIG. 6, Steps S21 and S22 illustrated in FIG. 5 are replaced with Steps S21*a* and S22*a*, respectively.

Figure 7:
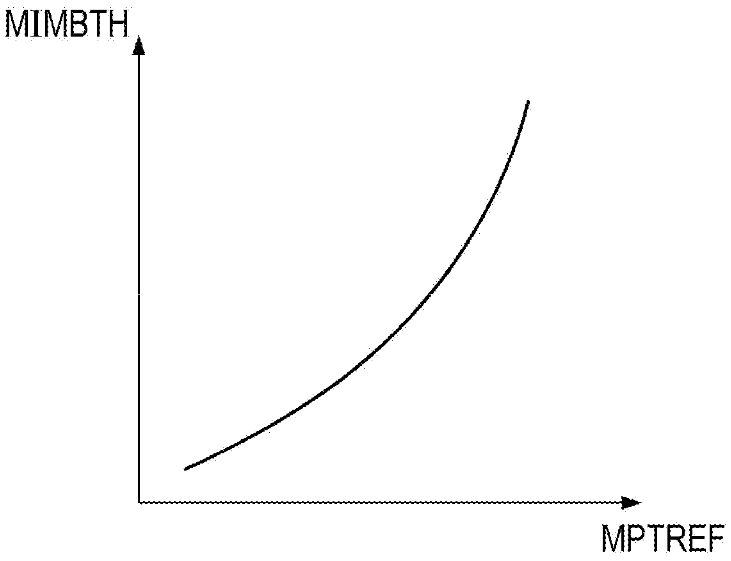
FIG. 7 illustrates a table referred to in the process illustrated in FIG. 6.

In Step S21*a*, an MIMBTH table illustrated in FIG. 7 is searched in accordance with the reference component strength MPTREF, and a determination strength threshold MIMBTH is calculated. The MIMBTH table is set such that the determination strength threshold MIMBTH increases with an increase in the reference component strength MPTREF and the slope of the set curve increases with an increase in the determination strength threshold MIMBTH.

In Step S22*a*, it is determined whether the 0.5th-order frequency component strength MIMB is larger than the determination strength threshold MIMBTH. When the determination is positive (YES), it is determined that an imbalance fault is occurring (Step S23).

According the this modification example, because an imbalance fault determination is made by comparing the 0.5th-order frequency component strength MIMB with the determination strength threshold MIMBTH set at a value that increases with an increase in the reference component strength MPTREF, the determination strength threshold MIMBTH reflects the effects of the degradation in the response characteristic of the LAF sensor 15, and the effects of the degradation in the response characteristic can be suppressed. That is, setting the MIMBTH table as illustrated in FIG. 7 can suppress a decrease in the determination accuracy even when the relationship between the reference component strength MPTREF and the 0.5th-order frequency component strength MIMB is not completely linear, as indicated by the curve L13 illustrated in FIG. 3.

In this modification example, Steps S21*a*, S22*a*, S23, and S24 correspond to the imbalance fault determining unit.

Second Embodiment

In the first embodiment, the fluctuation signal SPT generated by combining the first signal Sf1 and the second signal Sf2 is used in determination. In the present embodiment, switching the first signal Sf1 and the second signal Sf2 is used in determination. The details other than the points described below are the same as those in the first embodiment.

Figure 8:
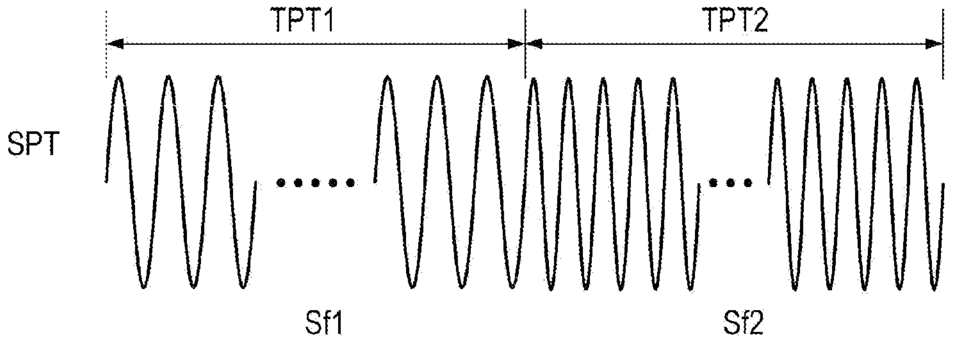
FIG. 8 is a timing chart for describing a technique for switching two signals with different frequencies and generating a fluctuation signal.

As illustrated in FIG. 8, first, in a first fluctuation period TPT1, air-fuel ratio fluctuation control is executed using the first signal Sf1 (with the frequency f1) as the fluctuation signal SPT and the first frequency component strength MPTf1 is calculated. Then, in a second fluctuation period TPT2, air-fuel ratio fluctuation control is executed using the second signal Sf2 (with the frequency f2) as the fluctuation signal SPT and the second frequency component strength MPTf2 is calculated. In the present embodiment, the 0.5th-order frequency component strength MIMB is used in such a way that a mean value MIMBAV of both a first 0.5th-order frequency component strength MIMB1 calculated in the first fluctuation period TPT1 and a second 0.5th-order frequency component strength MIMB2 calculated in the second fluctuation period TPT2 is used in determination.

Figure 9:
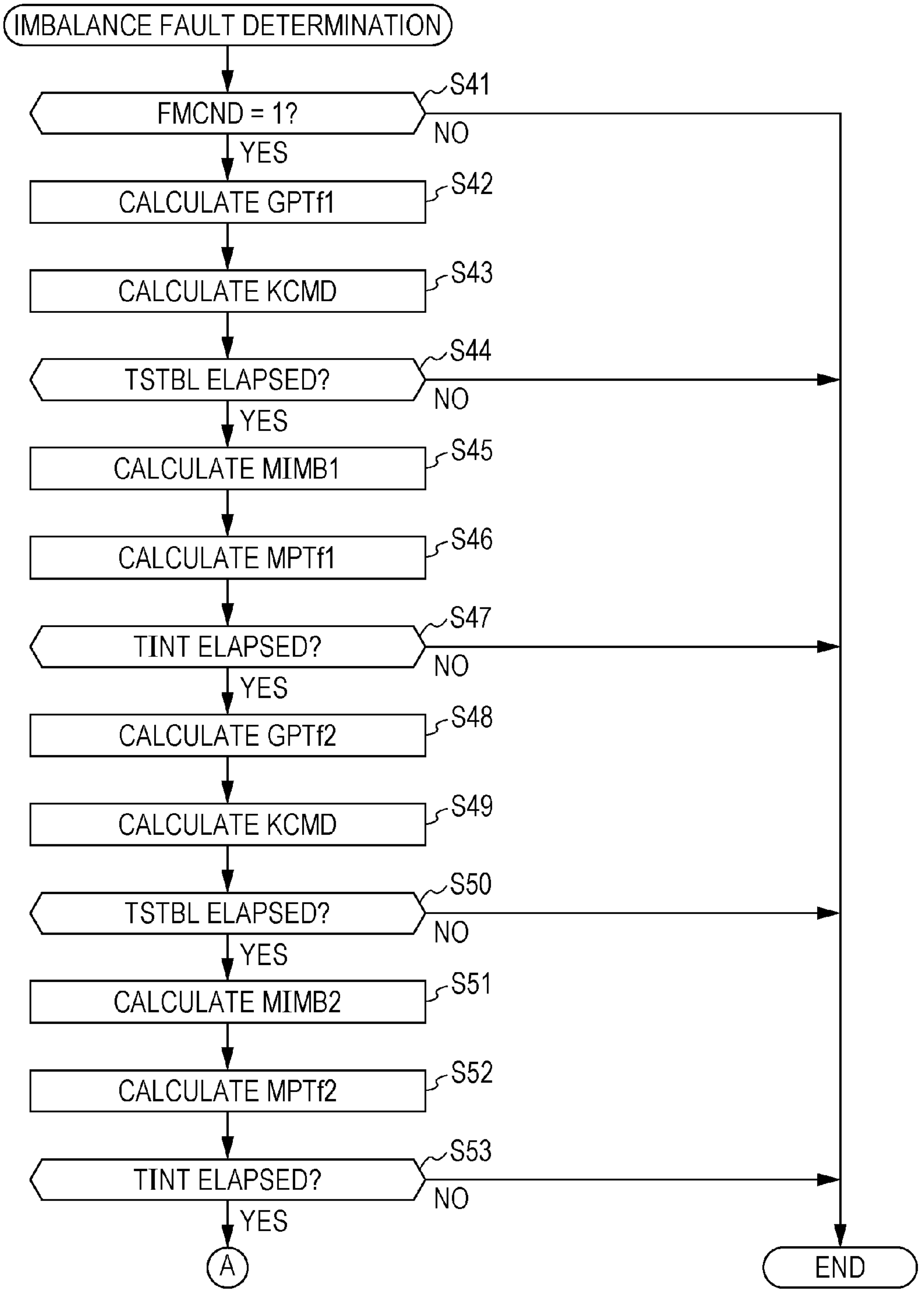
FIG. 9 is a flowchart of an imbalance fault determination process (second embodiment).
Figure 10:
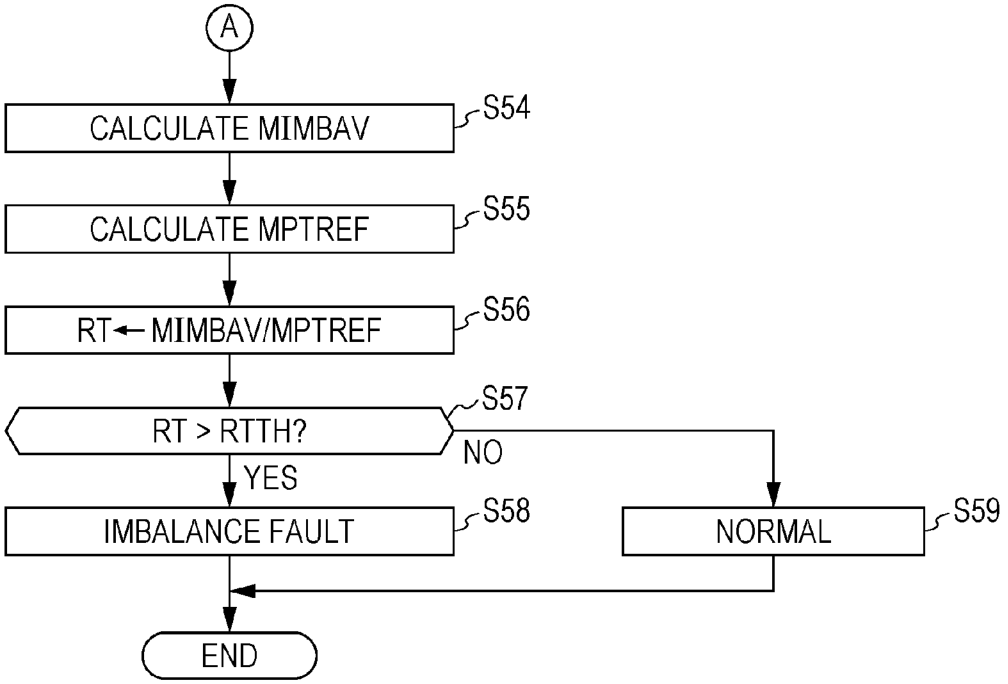
FIG. 10 is a flowchart of the imbalance fault determination process (second embodiment).

FIGS. 9 and 10 are flowcharts of an imbalance fault determination process according to the present embodiment.

Steps S41 and S42 are the same as Steps S11 and S12 illustrated in FIG. 5, respectively. In Step S43, the target equivalent ratio KCMD is calculated by the following expression (21). The use of the target equivalent ratio KCMD calculated by Expression (21) enables air-fuel ratio fluctuation control using the first signal Sf1.

$$KCMD = DAF \times GPTf1 + 1 \qquad (21)$$

In Step S44, it is determined whether the predetermined stabilization time TSTBL has elapsed from the start of executing the air-fuel ratio fluctuation control using the first signal Sf1. When the determination becomes positive (YES), the first 0.5th-order frequency component strength MIMB1 and the first frequency component strength MPTf1 are calculated (Steps S45 and S46).

In Step S47, it is determined whether the predetermined integration time TINT has elapsed from the start of calculating the first frequency component strength MPTf1. When the determination is positive (YES), the second signal value GPTf2 is calculated by Expression (16) provided above (Step S48). In Step S49, the target equivalent ratio KCMD is calculated by the following expression (22). The use of the target equivalent ratio KCMD calculated by Expression (22) enables air-fuel ratio fluctuation control using the second signal Sf2.

$$KCMD=DAF\times GPTf2+1 \quad (22)$$

In Step S50, it is determined whether the predetermined stabilization time TSTBL has elapsed from the start of executing the air-fuel ratio fluctuation control using the second signal Sf2. When the determination becomes positive (YES), the second 0.5th-order frequency component strength MIMB2 and the second frequency component strength MPTf2 are calculated (Steps S51 and S52).

In Step S53, it is determined whether the predetermined integration time TINT has elapsed from the start of calculating the second frequency component strength MPTf2. When the determination becomes positive (YES), the process proceeds to Step S54 (FIG. 10) and the 0.5th-order frequency component strength mean value MIMBAV is calculated by the following expression (23).

$$MIMBAV=(MIMB1+MIMB2)/2 \quad (23)$$

In Step S55, the reference component strength MPTREF is calculated by Expressions (11) to (13) provided above. In Step S56, the determination parameter RT is calculated by the following expression (24).

$$RT=MIMBAV/MPTREF \quad (24)$$

Steps S57 to S59 are the same as Steps S22 to S24 illustrated in FIG. 5.

As described above, according to the present embodiment, the fluctuation signal SPT is generated by switching the first signal Sf1 and the second signal Sf2. When a combined signal of the first signal Sf1 and the second signal Sf2 is used, as in the first embodiment, because a frequency component (undulating component) corresponding to the difference between the frequencies of both signals (f2−f1) is contained in the LAF sensor output signal SLAF, the determination accuracy may decrease. In contrast, air-fuel ratio fluctuation control by switching of the first signal Sf1 and the second signal Sf2 can prevent the occurrence of the undulating component and enable accurate determination.

The first 0.5th-order frequency component strength MIMB1 is calculated in the first fluctuation period TPT1 where the fluctuation signal SPT is the first signal Sf1, the second 0.5th-order frequency component strength MIMB2 is calculated in the second fluctuation period TPT2 where the fluctuation signal SPT is the second signal Sf2, and the reference component strength MPTREF is calculated by applying the first frequency component strength MPTf1 and the second frequency component strength MPTf2 to Expression (11). The determination parameter RT is calculated by dividing the 0.5th-order frequency component strength mean value MIMBAV of the first and second 0.5th-order frequency component strengths MIMB1 and MIMB2 by the reference component strength MPTREF, and an imbalance fault is determined by comparing the determination parameter RT with the predetermined determination threshold RTTH. The use of the mean value MIMBAV in calculating the determination parameter RT enables the 0.5th-order frequency component strength MIMB in each of the first fluctuation period TPT1 and the second fluctuation period TPT2 to be properly reflected in the determination parameter RT.

In the present embodiment, Steps S41, S43, S48, and S49 illustrated in FIG. 9 correspond to the fluctuation signal generating unit and the air-fuel ratio fluctuation unit, Steps S46 and S51 in FIG. 9 and Step S54 in FIG. 10 correspond to the 0.5th-order frequency component strength calculating unit, Steps S46 and S52 in FIG. 9 correspond to the fluctuation frequency component strength calculating unit, Step S55 in FIG. 10 corresponds to the reference component strength calculating unit, and Steps S56 to S59 correspond to the imbalance fault determining unit.

Modification Example

Figure 11:
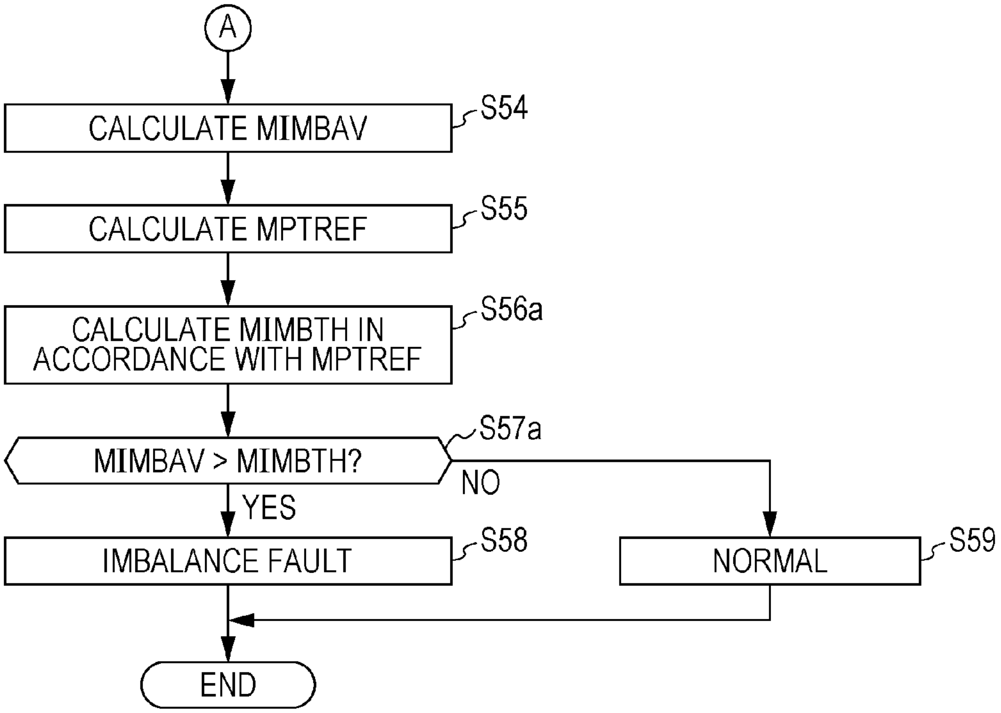
FIG. 11 is a flowchart that illustrates a modification example of the process illustrated in FIG. 10.

The present embodiment may be modified as in the modification example of the first embodiment. That is, Steps S56 and S57 illustrated in FIG. 10 may be replaced with Steps S56*a* and S57*a* illustrated in FIG. 11. In this modification example, Steps S56*a*, S57*a*, S58, and S59 correspond to the imbalance fault determining unit.

This modification example can offer substantially the same advantageous effects as those in the first embodiment.

Embodiments other than the above-described embodiments are possible, and various modifications may be made. In the above-described embodiments, the first frequency f1 is set at a frequency lower than the 0.5th-order frequency fIMB and the second frequency f2 is set at a frequency higher than the 0.5th-order frequency fIMB. Alternatively, for example, both the first and second frequencies f1 and f2 may be set at a frequency lower than the 0.5th-order frequency fIMB.

In the above-described embodiments, each of the first and second frequencies f1 and f2 is set at a value of a constant multiple of the engine rotation frequency fNE (a frequency synchronized with the engine rotation). Alternatively, they may be set at fixed frequencies of approximately 4 Hz and 6 Hz, respectively. If they are fixed frequencies, the range of the number NE of revolutions of the engine in the condition for executing imbalance fault determination may preferably be limited to a relatively narrow range.

The process of calculating the frequency component strength may be performed at optimal execution intervals separately from the process of determining an imbalance fault. In that case, in the imbalance fault determination process, the frequency component strength is not calculated, the frequency component strengths (0.5th-order frequency component strength MIMB, first frequency component strength MPTf1, second frequency component strength MPTf2) calculated in the frequency component strength calculation process concurrently performed are read, and the determination process is performed. Alternatively, in a predetermined sampling period from the time when air-fuel ratio fluctuation control becomes stable, the LAF sensor output signal SLAF may be sampled at optimal intervals, sampled data may be stored, and, after the completion of the predetermined sampling period, the sample data may be collectively processed to calculate each frequency component strength. In that case, fast Fourier transform (FFT) may be used.

In the above-described embodiments, the 0.5th-order frequency component strength MIMB is calculated during execution of air-fuel ratio fluctuation control. Alternatively, it may be calculated when air-fuel ratio fluctuation control is not executed. In that case, it is preferable that the engine operation region for executing air-fuel ratio fluctuation control and calculating the first and second frequency component strengths MPTf1 and MPTf2 may be limited to a relatively narrow range and the 0.5th-order frequency component strength MIMB may be calculated in that limited engine operation region.

The embodiments are also applicable to an air-fuel ratio fluctuation control apparatus for, for example, an engine for marine propulsion, such as an outboard motor having a crankshaft extending in the vertical direction.

According to a first aspect of the embodiments, an apparatus for controlling an air-fuel ratio of an internal-combustion engine includes an air-fuel ratio detecting unit (15), a fluctuation signal generating unit, an air-fuel ratio fluctuation unit, a 0.5th-order frequency component strength calculating unit, a fluctuation frequency component strength calculating unit, a reference component strength calculating unit, and an imbalance fault determining unit. The air-fuel ratio detecting unit (15) detects an air-fuel ratio in an exhaust path of the internal-combustion engine including a plurality of cylinders. The fluctuation signal generating unit generates a fluctuation signal (SPT) for causing the air-fuel ratio to fluctuate using a first signal (Sf1) with a first frequency (f1) and a second signal (Sf2) with a second frequency (f2). The first frequency (f1) is different from a 0.5th-order frequency (fIMB). The 0.5th-order frequency (fIMB) is equal to ½ of a frequency (fNE) corresponding to a rotation speed (NE) of the internal-combustion engine. The second frequency (f2) is higher than the first frequency (f1) and different from the 0.5th-order frequency (fIMB). The air-fuel ratio fluctuation unit causes the air-fuel ratio to fluctuate in accordance with the fluctuation signal (SPT). The 0.5th-order frequency component strength calculating unit calculates strength (MIMB) of a 0.5th-order frequency component corresponding to the 0.5th-order frequency contained in an output signal of the air-fuel ratio detecting unit (15). The fluctuation frequency component strength calculating unit calculates strength (MPTf1) of a first frequency component corresponding to the first frequency and strength (MPTf2) of a second frequency component corresponding to the second frequency during operation of the air-fuel ratio fluctuation unit. The first frequency component and the second frequency component are contained in the output signal of the air-fuel ratio detecting unit (15). The reference component strength calculating unit calculates strength (MPTREF) of a reference component in accordance with the strength (MPTf1) of the first frequency component and the strength (MPTf2) of the second frequency component. The imbalance fault determining unit makes a determination of an imbalance fault in which air-fuel ratios of the plurality of cylinders vary beyond a tolerance limit on the basis of a relative relationship between the strength (MIMB) of the 0.5th-order frequency component and the strength (MPTREF) of the reference component.

According to the first aspect, the fluctuation signal is generated using the first signal with the first frequency different from the 0.5th-order frequency and the second signal with the second frequency higher than the first frequency and different from the 0.5th-order frequency, and the air-fuel ratio fluctuation control of causing the air-fuel ratio to fluctuate in accordance with the fluctuation signal is executed. The strength of the 0.5th-order frequency component, the strength of the first frequency component, and the strength of the second frequency component contained in the output signal of the air-fuel ratio detecting unit are calculated, and in addition, the strength of the reference component is calculated in accordance with the strength of each of the first and second frequency components. An imbalance fault is determined on the basis of the relative relationship between the strength of the 0.5th-order frequency component and the strength of the reference component. Calculating the strength of the first frequency component and that of the second frequency component using the two signals with mutually different frequencies, in addition, calculating the reference component strength corresponding to the estimated value of the normal 0.5th-order frequency component strength detected when air-fuel ratio fluctuation control for the 0.5th-order frequency is executed in the state where there is no imbalance fault of the air-fuel ratio in accordance with the strengths of the first and second frequency components, and using the reference component strength enables the effects of the degradation in the response characteristic of the air-fuel ratio detecting unit to be suppressed and enables an increase in the strength of the 0.5th-order frequency component resulting from an imbalance fault to be accurately determined. As a result, irrespective of degradation mode of the air-fuel ratio detecting unit, a decrease in the accuracy of determining an imbalance fault can be suppressed, and the accurate determination can be made.

According to a second aspect of the embodiments, in the apparatus in the first aspect of the embodiments, the fluctuation signal generating unit may generate the fluctuation signal (SPT) by combining the first and second signals (Sf1 and Sf2).

According to the second aspect, because the fluctuation signal is generated by combining the first and second signals, the time required for determination of an imbalance fault can be shortened. Accordingly, deterioration in the exhaust characteristic caused by the determination of the imbalance fault can be suppressed.

According to a third aspect of the embodiments, in the apparatus in the second aspect of the embodiments, the reference component strength calculating unit may calculate the strength (MPTREF) of the reference component by adding the strength (MPTf1) of the first frequency component to the strength (MPTf2) of the second frequency component at a ratio corresponding to the first and second frequencies (f1 and f2), and the imbalance fault determining unit may calculate a determination parameter (RT) by dividing the strength (MIMB) of the 0.5th-order frequency component by the strength (MPTREF) of the reference component and makes the determination by comparing the determination parameter (RT) with a determination parameter threshold (RTTH).

According to the third aspect, because the strength of the reference component is calculated by adding the strength of the first frequency component to the strength of the second frequency component at the ratio corresponding to the first and second frequencies, the proper estimated value of the above-described normal 0.5th-order frequency component strength is obtainable. The determination parameter is calculated by dividing the strength of the 0.5th-order frequency component by the strength of the reference component, and the imbalance fault is determined by comparing the determination parameter with the determination parameter threshold. That is, the determination parameter corresponds to a parameter in which the strength of the 0.5th-order frequency component is normalized using the strength of the reference component, and the use of this parameter can suppress the effects of the degradation in the response characteristic of the air-fuel ratio detecting unit.

According to a fourth aspect of the embodiments, in the apparatus in the second aspect of the embodiments, the reference component strength calculating unit may calculate the strength (MPTREF) of the reference component by adding the strength (MPTf1) of the first frequency component to the strength (MPTf2) of the second frequency component at a ratio corresponding to the first and second frequencies (f1 and f2), and the imbalance fault determining unit may make the determination by comparing the strength (MIMB) of the 0.5th-order frequency component with a determination strength threshold (MIMBTH), the determination strength threshold being set at a value that increases with an increase in the strength (MPTREF) of the reference component.

According to the fourth aspect, because the strength of the reference component is calculated by adding the strength of the first frequency component to the strength of the second frequency component at the ratio corresponding to the first and second frequencies, the proper estimated value of the above-described normal 0.5th-order frequency component strength is obtainable. Because the imbalance fault is determined by comparing the strength of the 0.5th-order frequency component with the determination strength threshold set at the value increasing with the increase in the strength of the reference component, the effects of the degradation in the response characteristic of the air-fuel ratio detecting unit are reflected in the determination strength threshold, and the effects of the degradation in the response characteristic can be suppressed.

According to a fifth aspect of the embodiments, in the apparatus in the first aspect of the embodiments, the fluctuation signal generating unit may generate the fluctuation signal (SPT) by switching the first signal (Sf1) and the second signal (Sf2).

According to the fifth aspect, the fluctuation signal is generated by switching the first signal and the second signal. When a combined signal of the first and second signals is used, because a frequency component (undulating component) corresponding to the difference between the frequencies of both signals is contained in the output signal of the air-fuel ratio detecting unit, the determination accuracy may decrease. In contrast, air-fuel ratio fluctuation control by switching the first signal and the second signal can prevent the occurrence of the undulating component and enable accurate determination.

According to a sixth aspect of the embodiments, in the apparatus in the fifth aspect of the embodiments, the 0.5th-order frequency component strength calculating unit may calculate a first 0.5th-order frequency component strength (MIMB1) in a first fluctuation period (TPT1) where the fluctuation signal (SPT) is the first signal (Sf1) and may calculate a second 0.5th-order frequency component strength (MIMB2) in a second fluctuation period (TPT2) where the fluctuation signal (SPT) is the second signal (Sf2), the reference component strength calculating unit may calculate the strength (MPTREF) of the reference component by adding the strength (MPTf1) of the first frequency component to the strength (MPTf2) of the second frequency component at a ratio corresponding to the first and second frequencies (f1 and f2), and the imbalance fault determining unit may calculate a determination parameter (RT) by dividing a mean value (MIMBAV) of the first and second 0.5th-order frequency component strengths (MIMB1 and MIMB2) by the strength (MPTREF) of the reference component and may make the determination by comparing the determination parameter (RT) with a determination parameter threshold (RTTH).

According to the sixth aspect, the first 0.5th-order frequency component strength is calculated in the first fluctuation period where the fluctuation signal is the first signal, the second 0.5th-order frequency component strength is calculated in the second fluctuation period where the fluctuation signal is the second signal, and the strength of the reference component is calculated by adding the strength of the first frequency component to the strength of the second frequency component at the ratio corresponding to the first and second frequencies. In addition, the determination parameter is calculated by dividing the mean value of the first and second 0.5th-order frequency component strengths by the strength of the reference component, and the imbalance fault is determined by comparing the determination parameter with the determination parameter threshold. That is, the determination parameter corresponds to a parameter in which the strength of the 0.5th-order frequency component is normalized using the strength of the reference component, and the use of this determination parameter can suppress the effects of the degradation in the response characteristic of the air-fuel ratio detecting unit.

According to a seventh aspect of the embodiments, in the apparatus in the fifth aspect of the embodiments, the 0.5th-order frequency component strength calculating unit may calculate a first 0.5th-order frequency component strength (MIMB1) in a first fluctuation period (TPT1) where the fluctuation signal (SPT) is the first signal (Sf1) and may calculate a second 0.5th-order frequency component strength (MIMB2) in a second fluctuation period (TPT2) where the fluctuation signal (SPT) is the second signal (Sf2), the reference component strength calculating unit may calculate the strength (MPTREF) of the reference component by adding the strength (MPTf1) of the first frequency component to the strength (MPTf2) of the second frequency component at a ratio corresponding to the first and second frequencies (f1 and f2), and the imbalance fault determining unit may make the determination by comparing a mean value (MIMBAV) of the first and second 0.5th-order frequency component strengths (MIMB1 and MIMB2) with a determination strength threshold (MIMBTH), the determination strength threshold (MIMBTH) being set at a value that increases with an increase in the strength (MPTREF) of the reference component.

According to the seventh aspect, the first 0.5th-order frequency component strength is calculated in the first fluctuation period where the fluctuation signal is the first signal, the second 0.5th-order frequency component strength is calculated in the second fluctuation period where the fluctuation signal is the second signal, and the strength of the reference component is calculated by adding the strength of the first frequency component to the strength of the second frequency component at the ratio corresponding to the first and second frequencies. In addition, the imbalance fault is determined by comparing the mean value of the first and second 0.5th-order frequency component strengths with the determination strength threshold set at the value increasing with the increase in the strength of the reference component. Accordingly, the effects of the degradation in the response characteristic of the air-fuel ratio detecting unit are reflected in the determination strength threshold, and the effects of the degradation in the response characteristic can be suppressed.

According to an eighth aspect of the embodiments, in the apparatus in the first aspect of the embodiments, the first frequency (f1) may be set at a frequency lower than the 0.5th-order frequency (fIMB), and the second frequency (f2) may be set at a frequency higher than the 0.5th-order frequency (fIMB).

According to the eighth aspect, the first frequency is set at the frequency lower than the 0.5th-order frequency, and the second frequency is set at the frequency higher than the 0.5th-order frequency. Because the first frequency is set below the 0.5th-order frequency and the second frequency is set above the 0.5th-order frequency, the accuracy of calculating the reference component strength corresponding to the estimated value of the normal 0.5th-order frequency component strength can be enhanced.

According to a ninth aspect of the embodiments, in the apparatus in the first aspect of the embodiments, each of the first and second frequencies (f1 and f2) may be set at a frequency higher than a cutoff frequency (fCT1) in a frequency response characteristic of the air-fuel ratio detecting unit.

According to the ninth aspect, because each of the first and second frequencies is set at the frequency higher than the cutoff frequency in the frequency response characteristic of the air-fuel ratio detecting unit, the effects of the degradation in the response characteristic of the air-fuel ratio detecting unit are reflected in both the strength of the first frequency component and the strength of the second frequency component. As a result, the accuracy of calculating the strength of the reference component can be enhanced.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for controlling an air-fuel ratio of an internal-combustion engine, the apparatus comprising:

an air-fuel ratio detector configured to detect an air-fuel ratio in an exhaust path of the internal-combustion engine including a plurality of cylinders;

a fluctuation signal generating device configured to generate a fluctuation signal for causing the air-fuel ratio to fluctuate using a first signal with a first frequency and a second signal with a second frequency, the first frequency being different from a 0.5th-order frequency, the 0.5th-order frequency being equal to ½ of a frequency corresponding to a rotation speed of the internal-combustion engine, the second frequency being higher than the first frequency and different from the 0.5th-order frequency;

an air-fuel ratio fluctuation device configured to cause the air-fuel ratio to fluctuate in accordance with the fluctuation signal;

a 0.5th-order frequency component strength calculator configured to calculate strength of a 0.5th-order frequency component corresponding to the 0.5th-order frequency contained in an output signal of the air-fuel ratio detector;

a fluctuation frequency component strength calculator configured to calculate strength of a first frequency component corresponding to the first frequency and strength of a second frequency component corresponding to the second frequency during operation of the air-fuel ratio fluctuation device, the first frequency component and the second frequency component being contained in the output signal of the air-fuel ratio detector;

a reference component strength calculator configured to calculate strength of a reference component in accordance with the strength of the first frequency component and the strength of the second frequency component; and an imbalance fault determining device configured to make a determination of an imbalance fault in which air-fuel ratios of the plurality of cylinders vary beyond a tolerance limit on a basis of a relative relationship between the strength of the 0.5th-order frequency component and the strength of the reference component.

2. The apparatus according to claim 1, wherein the fluctuation signal generating device is configured to generate the fluctuation signal by combining the first and second signals.

3. The apparatus according to claim 2, wherein the reference component strength calculator is configured to calculate the strength of the reference component by adding the strength of the first frequency component to the strength of the second frequency component at a ratio corresponding to the first and second frequencies, and the imbalance fault determining device is configured to calculate a determination parameter by dividing the strength of the 0.5th-order frequency component by the strength of the reference component, the imbalance fault determining device being configured to make the determination by comparing the determination parameter with a determination parameter threshold.

4. The apparatus according to claim 3, wherein the first frequency is set at a frequency lower than the 0.5th-order frequency, and the second frequency is set at a frequency higher than the 0.5th-order frequency.

5. The apparatus according to claim 3, wherein each of the first and second frequencies is set at a frequency higher than a cutoff frequency in a frequency response characteristic of the air-fuel ratio detector.

6. The apparatus according to claim 2, wherein the reference component strength calculator is configured to calculate the strength of the reference component by adding the strength of the first frequency component to the strength of the second frequency component at a ratio corresponding to the first and second frequencies, and the imbalance fault determining device is configured to make the determination by comparing the strength of the 0.5th-order frequency component with a determination strength threshold, the determination strength threshold being set at a value that increases with an increase in the strength of the reference component.

7. The apparatus according to claim 6, wherein the first frequency is set at a frequency lower than the 0.5th-order frequency, and the second frequency is set at a frequency higher than the 0.5th-order frequency.

8. The apparatus according to claim 6, wherein each of the first and second frequencies is set at a frequency higher than a cutoff frequency in a frequency response characteristic of the air-fuel ratio detector.

9. The apparatus according to claim 1, wherein the fluctuation signal generating device is configured to generate the fluctuation signal by switching the first signal and the second signal.

10. The apparatus according to claim 9, wherein the 0.5th-order frequency component strength calculator is configured to calculate a first 0.5th-order frequency component strength in a first fluctuation period where the fluctuation signal is the first signal, the 0.5th-order frequency component strength calculator being configured to calculate a second 0.5th-order frequency component strength in a second fluctuation period where the fluctuation signal is the second signal, the reference component strength calculator is configured to calculate the strength of the reference component by adding the strength of the first frequency component to the strength of the second frequency component at a ratio corresponding to the first and second frequencies, and the imbalance fault determining device is configured to calculate a determination parameter by dividing a mean value of the first and second 0.5th-order frequency component strengths by the strength of the reference component, imbalance fault determining device being configured to make the determination by comparing the determination parameter with a determination parameter threshold.

11. The apparatus according to claim 10, wherein the first frequency is set at a frequency lower than the 0.5th-order frequency, and the second frequency is set at a frequency higher than the 0.5th-order frequency.

12. The apparatus according to claim 10, wherein each of the first and second frequencies is set at a frequency higher than a cutoff frequency in a frequency response characteristic of the air-fuel ratio detector.

13. The apparatus according to claim 9, wherein the 0.5th-order frequency component strength calculator is configured to calculate a first 0.5th-order frequency component strength in a first fluctuation period where the fluctuation signal is the first signal, the 0.5th-order frequency component strength calculator being configured to calculate a second 0.5th-order frequency component strength in a second fluctuation period where the fluctuation signal is the second signal, the reference component strength calculator is configured to calculate the strength of the reference component by adding the strength of the first frequency component to the strength of the second frequency component at a ratio corresponding to the first and second frequencies, and the imbalance fault determining device is configured to make the determination by comparing a mean value of the first and second 0.5th-order frequency component strengths with a determination strength threshold, the determination strength threshold being set at a value that increases with an increase in the strength of the reference component.

14. The apparatus according to claim 13, wherein the first frequency is set at a frequency lower than the 0.5th-order frequency, and the second frequency is set at a frequency higher than the 0.5th-order frequency.

15. The apparatus according to claim 13, wherein each of the first and second frequencies is set at a frequency higher than a cutoff frequency in a frequency response characteristic of the air-fuel ratio detector.

16. The apparatus according to claim 1, wherein the first frequency is set at a frequency lower than the 0.5th-order frequency, and the second frequency is set at a frequency higher than the 0.5th-order frequency.

17. The apparatus according to claim 16, wherein each of the first and second frequencies is set at a frequency higher than a cutoff frequency in a frequency response characteristic of the air-fuel ratio detector.

18. The apparatus according to claim 1, wherein each of the first and second frequencies is set at a frequency higher than a cutoff frequency in a frequency response characteristic of the air-fuel ratio detector.

19. The apparatus according to claim 18, wherein the first frequency is set at a frequency lower than the 0.5th-order frequency, and the second frequency is set at a frequency higher than the 0.5th-order frequency.

20. An apparatus for controlling an air-fuel ratio of an internal-combustion engine, the apparatus comprising:

air-fuel ratio detecting means for detecting an air-fuel ratio in an exhaust path of the internal-combustion engine including a plurality of cylinders;

fluctuation signal generating means for generating a fluctuation signal for causing the air-fuel ratio to fluctuate using a first signal with a first frequency and a second signal with a second frequency, the first frequency being different from a 0.5th-order frequency, the 0.5th-order frequency being equal to ½ of a frequency corresponding to a rotation speed of the internal-combustion engine, the second frequency being higher than the first frequency and different from the 0.5th-order frequency;

air-fuel ratio fluctuation means for causing the air-fuel ratio to fluctuate in accordance with the fluctuation signal;

0.5th-order frequency component strength calculating means for calculating strength of a 0.5th-order frequency component corresponding to the 0.5th-order frequency contained in an output signal of the air-fuel ratio detecting means;

fluctuation frequency component strength calculating means for calculating strength of a first frequency component corresponding to the first frequency and strength of a second frequency component corresponding to the second frequency during operation of the air-fuel ratio fluctuation means, the first frequency component and the second frequency component being contained in the output signal of the air-fuel ratio detecting means;

reference component strength calculating means for calculating strength of a reference component in accordance with the strength of the first frequency component and the strength of the second frequency component; and imbalance fault determining means for making a determination of an imbalance fault in which air-fuel ratios of the plurality of cylinders vary beyond a tolerance limit on a basis of a relative relationship between the strength of the 0.5th-order frequency component and the strength of the reference component.

* * * * *